United States Patent
Frank et al.

(10) Patent No.: US 9,024,951 B2
(45) Date of Patent: May 5, 2015

(54) DEVICES AND METHODS FOR OBTAINING HIGH-LOCAL-CONTRAST IMAGE DATA

(75) Inventors: Michael Frank, Sunnyvale, CA (US); Anup Sharma, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 1083 days.

(21) Appl. No.: 13/028,523

(22) Filed: Feb. 16, 2011

(65) Prior Publication Data

US 2012/0206470 A1    Aug. 16, 2012

(51) Int. Cl.
| H04N 1/407 | (2006.01) |
| H04N 5/235 | (2006.01) |
| G06T 5/00 | (2006.01) |
| H04N 101/00 | (2006.01) |

(52) U.S. Cl.
CPC ........... *H04N 1/4078* (2013.01); *H04N 5/2355* (2013.01); *G06T 5/009* (2013.01); *H04N 2101/00* (2013.01); *G06T 2207/20208* (2013.01)

(58) Field of Classification Search
CPC ................... G06T 5/008; G06T 5/007; G06T 2207/20208; G06T 2207/10096
See application file for complete search history.

(56) References Cited

U.S. PATENT DOCUMENTS

| 5,818,975 | A * | 10/1998 | Goodwin et al. ............. 382/274 |
| 5,828,793 | A | 10/1998 | Mann |
| 6,504,954 | B1 * | 1/2003 | Goldstein ..................... 382/168 |
| 6,560,285 | B1 * | 5/2003 | Reitmeier et al. ....... 375/240.16 |
| 6,567,124 | B1 * | 5/2003 | Tran .............................. 348/255 |
| 6,879,731 | B2 * | 4/2005 | Kang et al. .................... 382/274 |
| 7,003,153 | B1 * | 2/2006 | Kerofsky ....................... 382/168 |
| 7,280,705 | B1 * | 10/2007 | Frank et al. ................... 382/274 |
| 7,612,804 | B1 * | 11/2009 | Marcu et al. ............... 348/222.1 |
| 7,626,614 | B1 * | 12/2009 | Marcu ........................ 348/222.1 |
| 7,853,096 | B1 * | 12/2010 | Wilensky ..................... 382/274 |
| 7,899,267 | B2 * | 3/2011 | Dvir .............................. 382/274 |
| 8,014,034 | B2 * | 9/2011 | Hooper ........................ 358/3.27 |
| 8,169,656 | B2 * | 5/2012 | Kondo et al. .................. 358/1.2 |
| 8,238,687 | B1 * | 8/2012 | Lim et al. ...................... 382/274 |
| 8,447,132 | B1 * | 5/2013 | Galil ............................. 382/274 |
| 2003/0235342 | A1 * | 12/2003 | Gindele ........................ 382/260 |
| 2004/0091164 | A1 * | 5/2004 | Sakatani et al. .............. 382/254 |
| 2004/0213478 | A1 * | 10/2004 | Chesnokov ................... 382/260 |

(Continued)

OTHER PUBLICATIONS

FIFO Architecture, Functions, and Applications, Texas Instruments, 1999, pp. 1-34.*

(Continued)

*Primary Examiner* — David Zarka
*Assistant Examiner* — Phong Nguyen
(74) *Attorney, Agent, or Firm* — Fletcher Yoder PC

(57) ABSTRACT

Devices and methods for obtaining image data that preserves highlight details and shadow details from image data from a high dynamic range (HDR) image sensor are provided. For example, an image signal processor may include a first data path of a relatively high bit depth, front-end image processing logic, and a second data path of a relatively low bit depth. The first data path may receive HDR image data from an image sensor. The front-end image processing logic may convert the HDR image data into lower-bit-depth image data, while preserving highlight details and/or shadow details of the HDR image, by using at least two transfer functions that preserve different subsets of the high dynamic range. The second data path may output this lower-bit-depth image data to other image processing logic for additional image processing.

22 Claims, 12 Drawing Sheets
(1 of 12 Drawing Sheet(s) Filed in Color)

(56) References Cited

U.S. PATENT DOCUMENTS

| | | | |
|---|---|---|---|
| 2005/0074179 A1* | 4/2005 | Wilensky | 382/254 |
| 2005/0117799 A1* | 6/2005 | Fuh et al. | 382/169 |
| 2005/0180629 A1* | 8/2005 | Masuno et al. | 382/169 |
| 2005/0196052 A1* | 9/2005 | Xin et al. | 382/233 |
| 2006/0056724 A1* | 3/2006 | Le Dinh et al. | 382/274 |
| 2006/0153441 A1* | 7/2006 | Li | 382/162 |
| 2006/0232823 A1* | 10/2006 | Hooper | 358/3.27 |
| 2007/0009167 A1* | 1/2007 | Dance et al. | 382/254 |
| 2007/0041637 A1* | 2/2007 | Matsushima | 382/169 |
| 2007/0053607 A1* | 3/2007 | Mitsunaga | 382/274 |
| 2007/0183677 A1* | 8/2007 | Aguilar | 382/251 |
| 2007/0242141 A1* | 10/2007 | Ciurea | 348/239 |
| 2008/0055426 A1 | 3/2008 | Pertsel et al. | |
| 2009/0274387 A1 | 11/2009 | Jin | |
| 2010/0061648 A1* | 3/2010 | Wong et al. | 382/260 |
| 2010/0150473 A1 | 6/2010 | Kwon et al. | |
| 2010/0172411 A1* | 7/2010 | Efremov et al. | 375/240.12 |
| 2010/0195906 A1* | 8/2010 | Uliyar et al. | 382/167 |
| 2010/0290703 A1* | 11/2010 | Sim et al. | 382/172 |
| 2010/0328490 A1* | 12/2010 | Kurane et al. | 348/229.1 |
| 2010/0329554 A1* | 12/2010 | Zhai et al. | 382/167 |
| 2010/0329557 A1* | 12/2010 | Wang et al. | 382/171 |
| 2011/0096989 A1* | 4/2011 | Narasimha | 382/169 |
| 2012/0114236 A1* | 5/2012 | Finlayson et al. | 382/167 |
| 2012/0162290 A1* | 6/2012 | Shiomi | 345/690 |
| 2012/0170842 A1* | 7/2012 | Liu et al. | 382/167 |
| 2012/0306906 A1* | 12/2012 | Johnson et al. | 345/591 |

OTHER PUBLICATIONS

Line-Based, Reduced Memory, Wavelet Image Compression, Chrysafis et al., 2000, pp. 1-12.*

* cited by examiner

DEVICES AND METHODS FOR OBTAINING HIGH-LOCAL-CONTRAST IMAGE DATA

BACKGROUND

The present disclosure relates generally to image processing and, more particularly, to generating a high dynamic range (HDR) tone mapped, high-local-contrast image in an electronic device.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices increasingly employ cameras or other image capture devices. For example, handheld devices such as portable phones and portable media players increasingly use cameras to capture images and video. Even notebook and desktop computers may routinely include front-facing cameras and/or other image capture devices, allowing a user to easily generate user profile photographs and/or capture video for video conferencing. These image capture devices may capture image data of a bit depth higher than the data paths commonly used for image signal processing. Some image capture devices may capture image data with a bit depth exceeding 10 bits, for example, while image signal processor data paths may typically use image data of only 8 bits. In addition, many compression methods (e.g., MPEG, JPEG, and/or H.264) generally involve processing 8-bit image data. Accordingly, image data from image capture device may be compressed from a higher bit depth to a lower bit depth before reaching an image signal processor core, where most hardware image signal processing may take place. Reducing the bit depth of the image data from a higher bit depth (e.g., 10-14) to a lower bit depth (e.g., 8) may result in a loss of details as the dynamic range that can be described by the lower bit depth decreases correspondingly. Indeed, dynamic ranges within images will generally exceed the range of 8 bits, even though 8 bits may almost be sufficient to smoothly render a uniformly lit surface. However, shadows and specular highlights can easily require 14-16 bits to capture the full dynamic range of a scene.

Typically, the loss of dynamic range that occurs when higher-bit-depth image data is reduced to lower-bit-depth image data is mitigated by applying a transfer function. The transfer function may map the higher-bit-depth image data to lower-bit-depth image data in a manner that may be indistinguishable to the human eye over much of the original dynamic range. However, such image data compression may clip some highlights and/or shadows originally represented in the higher-bit-depth image data.

Various techniques have thus been developed for obtaining an image that appears to include all of the details of a higher-bit-depth, high dynamic range (HDR) image despite having a relatively low bit depth. Conventionally, these HDR techniques involve capturing multiple images at various levels of light exposure. Typically, at least one such image contains specular highlight details and at least one contains shadow details. Combining properly exposed portions of these multiple images into a single image may produce an image that includes both highlights and shadows. However, obtaining such an HDR-tone-mapped image in this manner may be memory and/or processor intensive, drawing additional power and reducing the efficiency of an electronic device. Moreover, because such HDR image processing may require multiple images taken at different exposure times, it may be difficult or impossible to obtain an HDR-tone-mapped image when an image involves a moving subject.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to devices and methods for obtaining image data that preserves highlight details and shadow details from image data from a high dynamic range (HDR) image sensor are provided. For example, an image signal processor may include a first data path of a relatively high bit depth, front-end image processing logic, and a second data path of a relatively low bit depth. The first data path may receive HDR image data from an image sensor. The front-end image processing logic may convert the HDR image data into lower-bit-depth image data, while preserving highlight details and/or shadow details of the HDR image, by using at least two transfer functions that preserve different subsets of the high dynamic range. The second data path may output this lower-bit-depth image data to other image processing logic for additional image processing.

Various refinements of the features noted above may be found in relation to various aspects of the present disclosure. Further features may also be incorporated in these various aspects as well. These refinements and additional features may be used individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee. Various aspects of this disclosure may be better understood upon reading the following detailed description and upon reference to the drawings in which.

DETAILED DESCRIPTION

Figure 1:
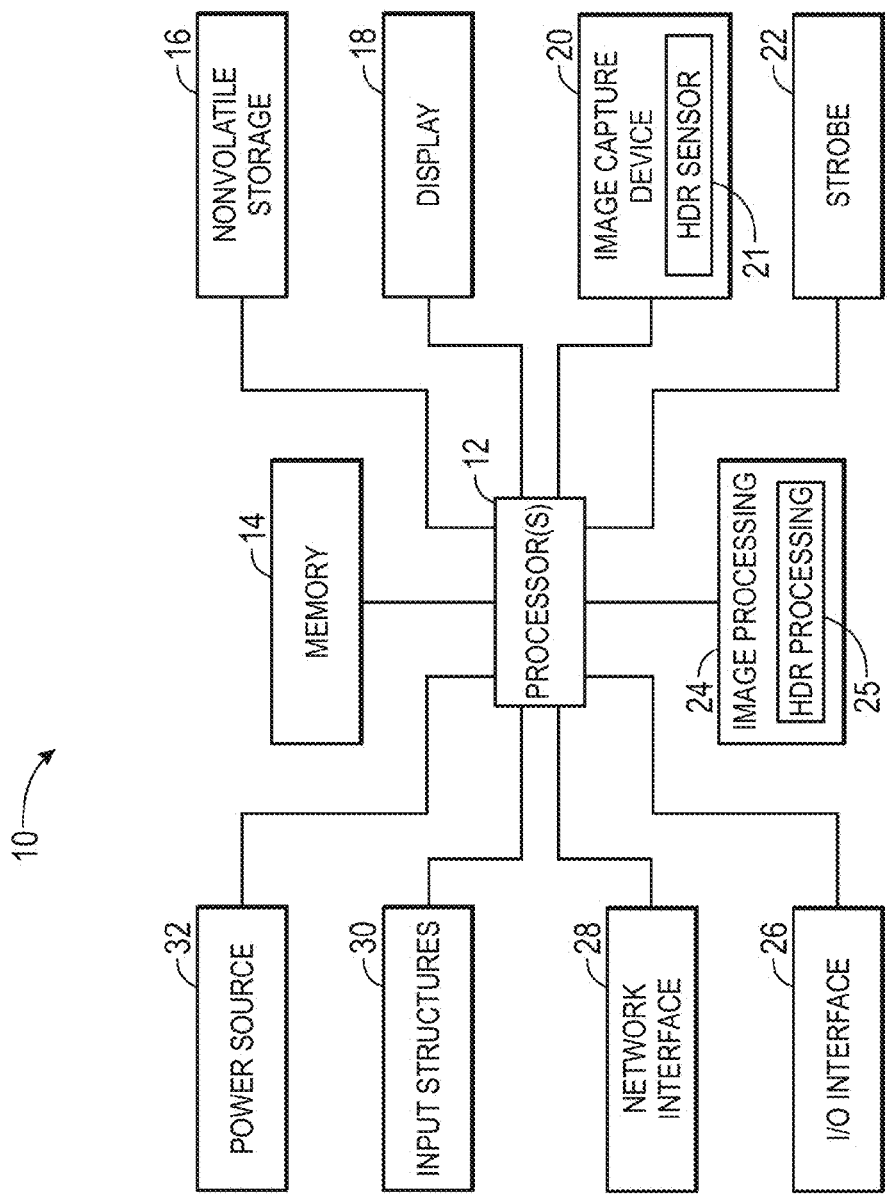
FIG. 1 is a block diagram of an electronic device capable of obtaining a high-local-contrast image, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As noted above, electronic devices may include image capture devices that are capable of capturing image data of a scene across a high dynamic range. While the image data from such image capture devices may be of a relatively high bit depth (e.g., 14 bits), this image data may include details found across such the high dynamic range. For example, such true high dynamic range (HDR) image data may be of a high enough bit depth to include both highlight details and shadow details of the scene in a single exposure. Because image processing may be more efficient at a lower bit depth (e.g., 8 bits) and, indeed, many image processing standards may rest upon such a lower bit depth (e.g., MPEG, JPEG, and/or H.264), the true HDR, high-bit-depth image data obtained by the image capture device may be reduced in bit depth before most image processing occurs.

Unlike some conventional techniques for reducing the bit depth of the high-bit-depth image data, present embodiments do not involve applying a single, global transfer function based on an average brightness, or luma value of the high-bit-depth image data. Although such techniques may compress the image data to a lower bit depth without losing contrast in a dynamic range near the average brightness, highlight details or shadow details that were captured in the original high-bit-depth image data may be lost. Instead, embodiments of the present disclosure may involve applying multiple transfer functions to the high-bit-depth image data from the image capture device, each transfer function producing compressed, lower-bit-depth image data that preserves details from a certain dynamic range of the high-bit-depth image data.

For example, an image signal processor according to present embodiments may apply a low-level transfer function that substantially preserves shadow details (but not necessarily highlight details) and a high-level transfer function that substantially preserves highlight details (but not necessarily shadow details). The image signal processor may blend such lower-bit-depth image data in proportions that vary depending on local brightness levels at different areas of the image. This blending process may produce "high local contrast" image data that preserves contrast in areas of both high and low brightness. When obtained using other techniques, such "high-local-contrast" image data is sometimes referred to as high dynamic range (HDR) image data, HDR-tone-mapped image data, or local-tone-mapped image data, even though this image data may in fact only simulate a high dynamic range by preserving a similar amount of local contrast that might be present if a high dynamic range were preserved in the image data. As used herein, the term "high-local-contrast image data" refers to such image data in which details in areas of high brightness and low brightness, present in higher-bit-depth image data captured by an image sensor of an image capture device, may be preserved.

Figure 2:
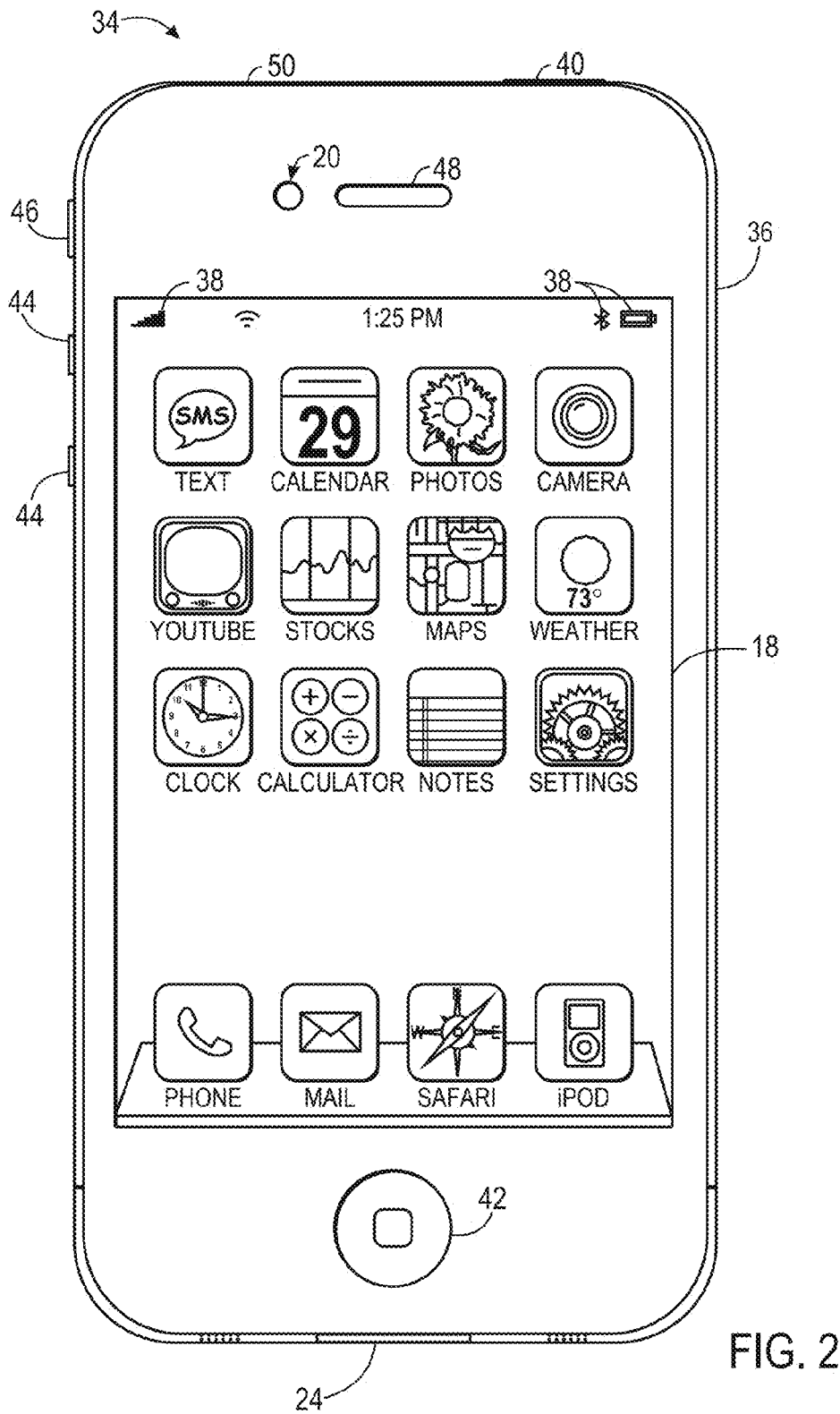
FIGS. 2 and 3 are front and back views, respectively, of a handheld embodiment of the electronic device of FIG. 1.
Figure 3:
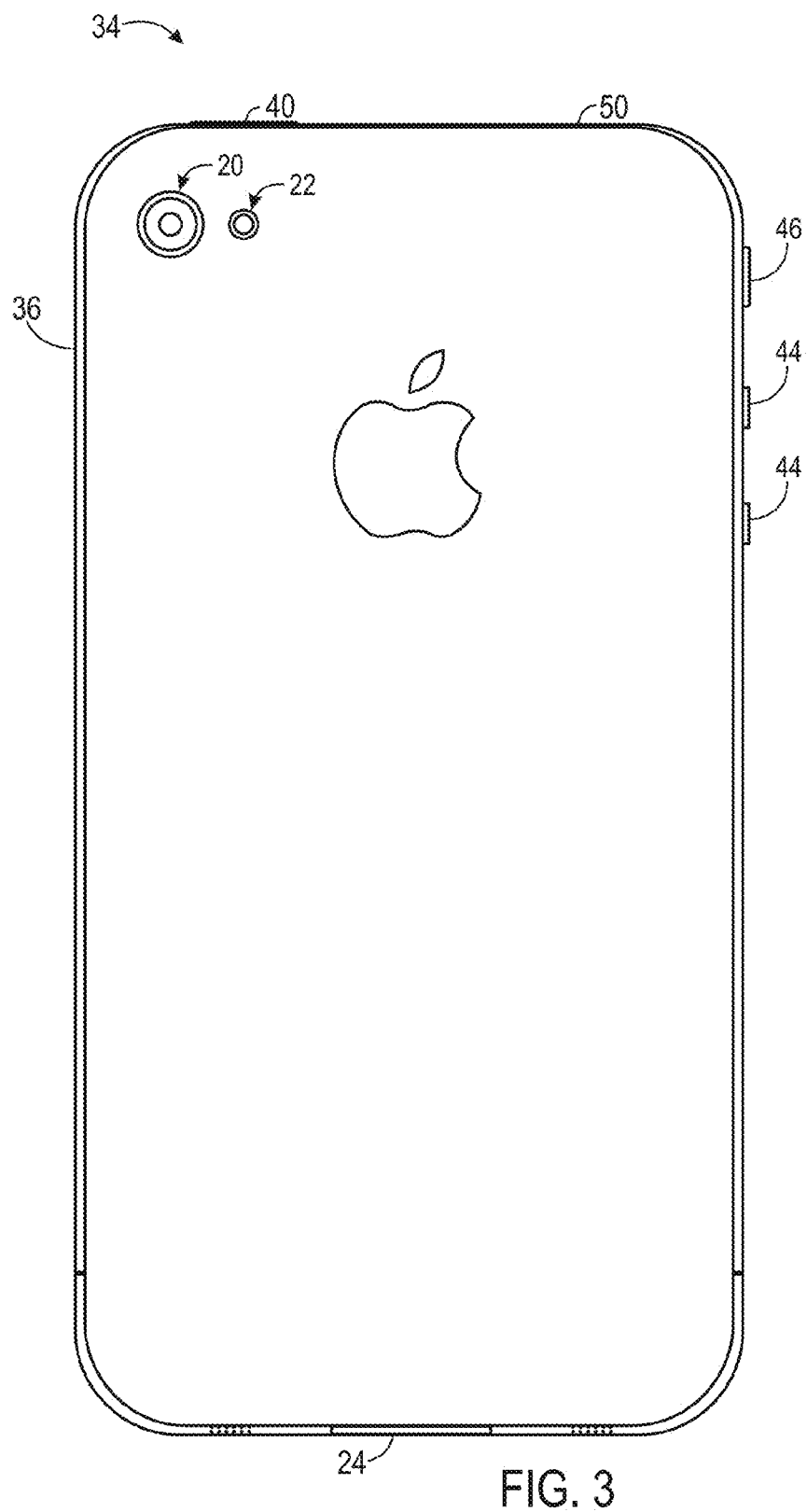

With the foregoing in mind, a general description of suitable electronic devices for performing the presently disclosed techniques is provided below. In particular, FIG. 1 is a block diagram depicting various components that may be present in an electronic device suitable for use with the present techniques. FIGS. 2 and 3 represent front and back views of a suitable electronic device, which may be, as illustrated, a handheld electronic device having an image capture device with a high dynamic range (HDR) sensor and image processing logic capable of processing such HDR image data to obtain a high-local-contrast image.

Turning first to FIG. 1, an electronic device 10 for performing the presently disclosed techniques may include, among other things, one or more processor(s) 12, memory 14, non-volatile storage 16, a display 18, image capture device 20 having an HDR image sensor 21, a strobe 22, image processing component 24 having an HDR processing component 25, an input/output (I/O) interface 26, network interfaces 28, input structures 30, and a power source 32. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

By way of example, the electronic device 10 may represent a block diagram of the handheld device depicted in FIG. 2 or similar devices. It should be noted that the image processing component 24 block, the processor(s) 12, and/or other data processing circuitry may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within electronic device 10.

In the electronic device 10 of FIG. 1, the processor(s) 12 and/or other data processing circuitry may be operably coupled with the memory 14 and the nonvolatile memory 16 to perform various algorithms for carrying out the presently disclosed techniques. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions that may be executed by the processor(s) 12 to enable the electronic device 10 to provide various functionalities, including those described herein. The display 18 may be a touch-screen display, which may enable users to interact with a user interface of the electronic device 10.

The image capture device 20 may have an HDR image sensor 21 capable of obtaining image data of a scene of relatively high dynamic range. Image data obtained from the HDR image sensor 21 may have a relatively high bit depth. For example, the bit depth of image data from the HDR image sensor may be greater than 8 bits, and may be 9, 10, 11, 12, 13, 14, 15, or 16 bits or even higher. As will be discussed below, an HDR processing component 25 of the image processing component 24 may preserve highlight and shadow details captured by the HDR image sensor 21, even while reducing the bit depth to a lower, more manageable size. The strobe 22 may include any suitable light source, such as one or more xenon bulbs or light emitting diodes (LEDs). When a scene lacks sufficient lighting, the strobe 22 may fire to illuminate the scene during image capture.

After the HDR image sensor 21 of the image capture device 20 obtains relatively high bit depth image data, the HDR processing 25 of the image processing component 24 may convert the high bit depth image data (e.g., 14 bits) into lower bit depth image data (e.g., 8 bits). The HDR processing 25 may represent one component of the image processing component 24, which may be a hardware image signal processor (ISP). In some embodiments, the HDR processing 25 may convert the high bit depth image data from the HDR image sensor 21 into the lower bit depth image data at the frontend of the image processing component 24. By performing the conversion at the front end of the image processing component 24, other image processing logic of the image processing component 24 may perform additional processing with greater ease. In other embodiments, the HDR processing 25 may take place at a later stage of the image processing component 24.

As noted above, unlike some conventional techniques for reducing the bit depth of the high-bit-depth image data, the HDR processing 25 of the image processing component 24 may not apply a single, global transfer function based on an average brightness, or luma, value of the high-bit-depth image data. Although doing so may compress the high bit depth image data to a lower bit depth without loss of contrast in a dynamic range near the average brightness, highlight details or shadow details that were captured by the HDR image sensor 21 could be lost. Instead, as discussed in greater detail below, the HDR processing 25 may apply multiple transfer functions to the high-bit-depth image data from the HDR image sensor 21. Each transfer function may produce compressed, lower-bit-depth image data that preserves details from a certain dynamic range of the high-bit-depth image data. By way of example, the HDR processing 25 of the image processing component 24 may apply a low-level transfer function that substantially preserves shadow details (but not highlight details) and a high-level transfer function that substantially preserves highlight details (but not shadow details). The HDR processing 25 may blend the resulting lower-bit-depth image data in proportions that vary depending on local brightness levels at different areas of the image. This blending process may produce "high local contrast" image data that preserves contrast in areas of both high and low brightness.

The I/O interface 26 may enable electronic device 10 to interface with various other electronic devices, as may the network interfaces 28. The network interfaces 28 may include, for example, interfaces for a personal area network (PAN), such as a Bluetooth network, for a local area network (LAN), such as an 802.11x Wi-Fi network, and/or for a wide area network (WAN), such as a 3G cellular network. Through the network interfaces 28, the electronic device 10 may interface with other devices that may include a strobe 22. The input structures 30 of the electronic device 10 may enable a user to interact with the electronic device 10 (e.g., pressing a button to initiate an image capture sequence). The power source 32 of the electronic device 10 may be any suitable source of power, such as a rechargeable lithium polymer (Li-poly) battery and/or an alternating current (AC) power converter.

FIGS. 2 and 3 depict front and back views of a handheld device 34, which represents one embodiment of the electronic device 10. The handheld device 34 may represent, for example, a portable phone, a media player, a personal data organizer, a handheld game platform, or any combination of such devices. By way of example, the handheld device 34 may be a model of an iPod® or iPhone® available from Apple Inc. of Cupertino, Calif.

The handheld device 34 may include an enclosure 36 to protect interior components from physical damage and to shield them from electromagnetic interference. The enclosure 36 may surround the display 18, which may display indicator icons 38. The indicator icons 38 may indicate, among other things, a cellular signal strength, Bluetooth connection, and/or battery life. The I/O interfaces 24 may open through the enclosure 36 and may include, for example, a proprietary I/O port from Apple Inc. to connect to external devices. As indicated in FIG. 3, the reverse side of the handheld device 34 may include the image capture device 20 and the strobe 22.

User input structures 40, 42, 44, and 46, in combination with the display 18, may allow a user to control the handheld device 34. For example, the input structure 40 may activate or deactivate the handheld device 34, the input structure 42 may navigate user interface 20 to a home screen, a user-configurable application screen, and/or activate a voice-recognition feature of the handheld device 34, the input structures 44 may provide volume control, and the input structure 46 may toggle between vibrate and ring modes. A microphone 47 may obtain a user's voice for various voice-related features, and a speaker 48 may enable audio playback and/or certain phone capabilities. Headphone input 50 may provide a connection to external speakers and/or headphones.

Figure 4:
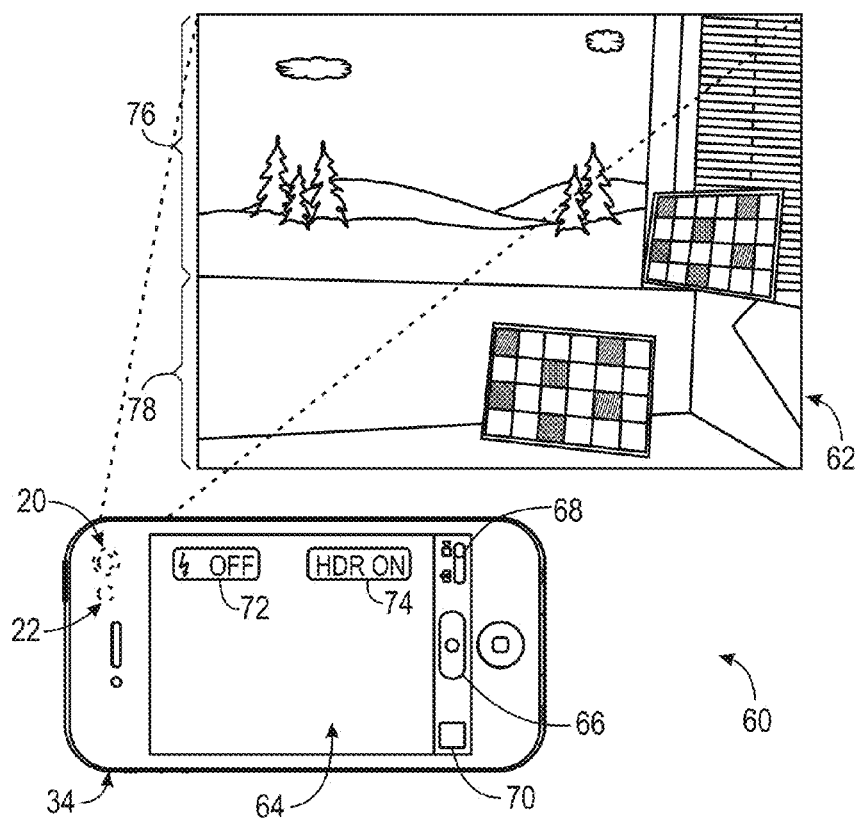
FIG. 4 is a schematic diagram of an image capture process using the electronic device of FIGS. 2 and 3, in accordance with an embodiment.

When the electronic device 10 (e.g., the handheld device 34) captures an image of a scene according to the techniques disclosed herein, the resulting image may have relatively high-local-contrast, in the manner of a high dynamic range (HDR) image. For example, as shown by an image capture process 60 of FIG. 4, the handheld device 34 may be used to obtain a high-local-contrast image of a scene 62. The image capture device 20 of the handheld device 34 generally may capture relatively high-bit-depth image data associated with the scene 62. For example, depending on the capabilities of the HDR image sensor 21, the image capture device 20 may obtain high-bit-depth image data of 9, 10, 11, 12, 13, 14, 15, and/or 16 bits, or more. A preview image of the scene 62 may appear on an image capture screen 64 displayed on the display 18 of the handheld device 34. Upon the selection of an image capture button 66 on the display 18, a high-local-contrast image of the scene 62 may be captured.

As seen on the display 18 of the handheld device 34, a rocker switch 68 may allow a user to select ordinary image capture or video image capture modes. A camera roll button 70 may allow a user to view recently obtained or recently captured images. Also on the image capture screen 64 may be a strobe function button 72 to place the strobe 22 into use always ("On"), never ("Off"), and/or automatically ("Auto"), for example. Whether the handheld device 34 obtains a high-local-contrast image may vary depending on whether an HDR selection button 74 is selected. That is, when the HDR selection button 74 is in an "On" position, the handheld device 34 may capture high-local-contrast images, and when the HDR selection button 74 is in an "Off" position, the handheld device 34 may capture images according to other techniques.

When the handheld device 34 is set to obtain a high-local contrast image of the scene 62, the contrast in both high-brightness areas 76 of the scene 62 and low-brightness areas 78 of the scene 62 may be preserved, as will be described in greater detail below. By contrast, as shown by an image 90 of FIG. 5, when the handheld device 34 globally applies a low-level transfer function to the image data obtained by the image capture device 20, only the low-brightness areas 78 of the scene 62 may be preserved. Indeed, some of the high-brightness areas 76 of the scene 62 may appear washed out, as highlight details in the high-brightness areas of the scene 62 may be reduced or may not be preserved at all. Likewise, as shown by an image 100 of FIG. 6, when the handheld device 34 globally applies a high-level transfer function to image data obtained by the image capture device 20, only details of the high-brightness areas 76 of the scene 62 may be preserved. When such a high-level transfer function is applied, details from the low-brightness areas 78 may be obscured.

Figure 5:
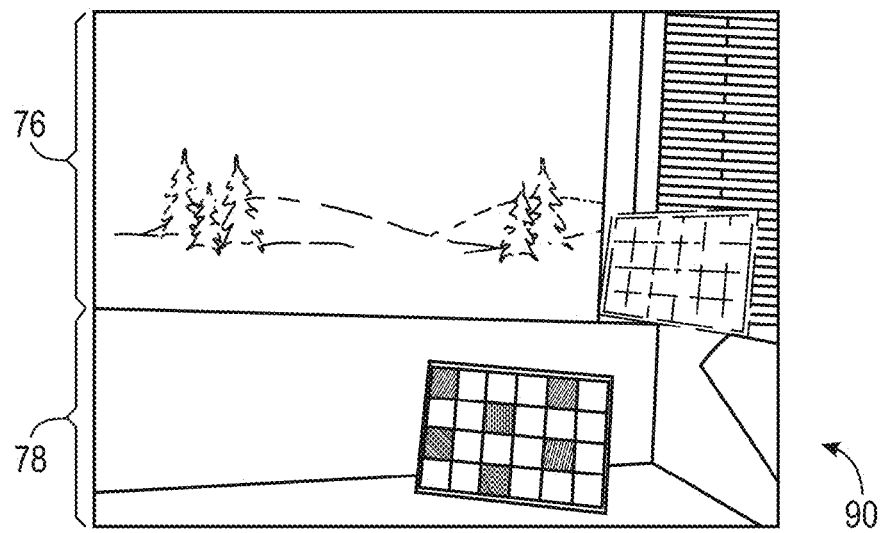
FIGS. 5 and 6 are schematic diagrams respectively illustrating the application of low-level and high-level transfer functions to image data originally having a high dynamic range, in accordance with embodiments.
Figure 6:
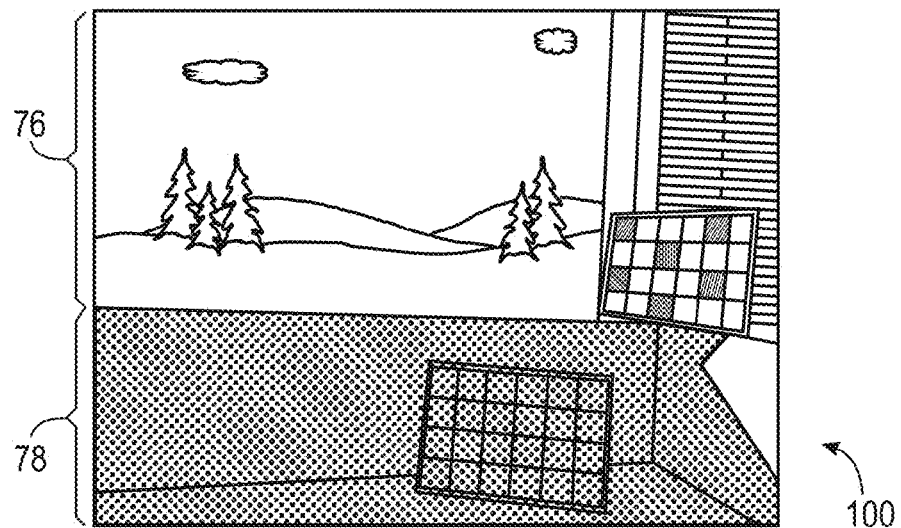

The loss of highlight details, as shown by the image 90 of FIG. 5, or the loss of shadow details, as shown by the image 100 of FIG. 6, may be avoided using the present techniques. In particular, rather than globally apply a single transfer function to all of the image data obtained by the image capture device 20, the handheld device 34 instead may apply both a low-level transfer function (producing, for example, the image 90 of FIG. 5) and a high-level transfer function (producing, for example, the image 100 of FIG. 6). The resulting image data may be blended together as suitable depending, for example, on the brightness levels of various portions of the image data to produce high-local-contrast image data.

Figure 7:
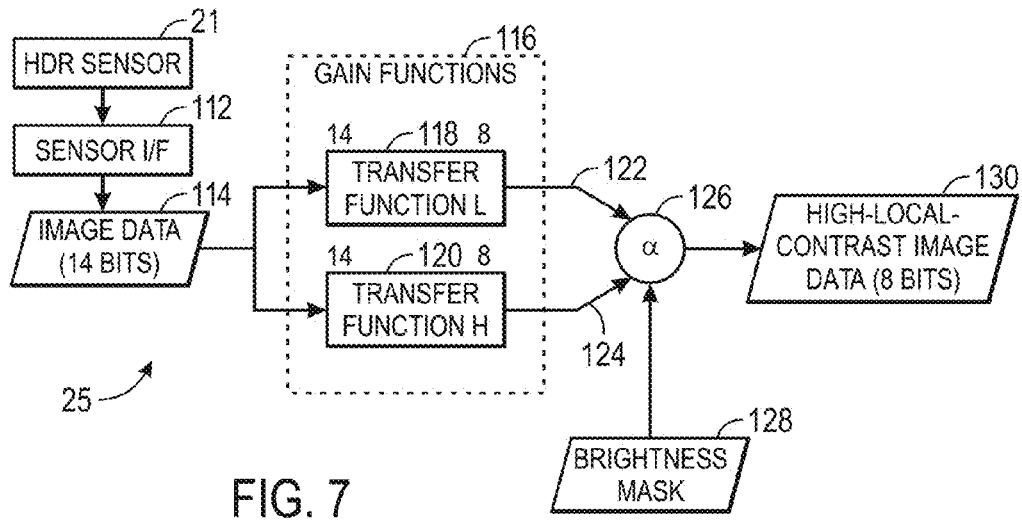
FIGS. 7 and 8 are schematic block diagrams of systems for obtaining high-local-contrast image data, in accordance with embodiments.

An electronic device 10, such as the handheld device 34, may obtain such a high-local-contrast image using a system such as the system 110 of FIG. 7. The system 110 of FIG. 7 represents one system for obtaining a high-local-contrast image without requiring multiple image exposures. The system 110 represents one implementation of the HDR processing component 25 of the image processing component 24 of the electronic device 10.

In the system 110 of FIG. 7, the HDR image sensor 21 of the image capture device 20 may provide image data 114 of a relatively high bit depth via a sensor interface (I/F) 112. In the example of FIG. 7, the image data 114 has a bit depth of 14 bits, which may account for many highlight and/or shadow details of a scene. However, it may be inefficient, cost prohibitive, and/or impractical to use this high-bit-depth image data 114 directly. Thus, the image data may be processed using at least two gain functions 116 that may reduce the bit depth of the image data 114 from its higher bit depth (e.g., 14 bits) to a lower bit depth (e.g., 8 bits). The gain functions 116 may be linear or nonlinear. By way of example, the gain functions 116 may provide linear or spline interpolation functions using 256 support points. However, the gain functions 116 may take any other form suitable to reduce the bit depth of the image data 114 from the higher bit depth (e.g., 14 bits) to the lower bit depth (e.g., 8 bits) such that at least one of the gain functions 116 preserves highlight details and at least one of the gain functions 116 preserves shadow details.

In the instant example of FIG. 7, the gain functions 116 may include a low-level transfer function 118 and a high-level transfer function 120. The low-level transfer function 118 may output image data 122 that substantially preserves the shadow details of the image data 114, while possibly excluding the highlight details of the image data 114 (e.g., producing image data like the image 90 of FIG. 5). Likewise, the high-level transfer function 120 may output image data 124 that substantially preserves the highlight details of the image data 114, while potentially excluding the shadow details (e.g., producing image like the image 100 of FIG. 6).

The shadow-preserving image data 122 and the highlight-preserving image data 124 may be blended by an alpha-processing component 126 based at least partly on local tone mapping as indicated by a brightness mask 128. As will be discussed below, the brightness mask 128 may be generated using a feed-forward or feedback process in hardware, software, and/or firmware. The brightness mask 128 may indicate local brightness levels present in the image data 114, 122, and/or 124.

The alpha processing component 126 may blend varying proportions of the shadow-preserving image data 122 and the highlight-preserving image data 124 depending on such local brightness levels indicated by the brightness mask 128. Doing so may preserves the local contrast of the image data 114, even while reducing the bit depth to a lower, more manageable size. For example, the brightness mask 128 may cause the alpha processing component 126 to primarily output the shadow-preserving image data 122 for low-brightness areas of the image data 114, such as the low-brightness areas 78 illustrated in FIG. 5. Likewise, the brightness mask 128 may cause the alpha processing component 126 to primarily output the highlight-preserving image data 124 for high-brightness areas 76 of the image data 114, such as the high-brightness areas 76 illustrated in FIG. 6. In this way, the system 110 of FIG. 7 thus may output high-local-contrast image data 130 of a lower bit depth than the image data 114. Although the high-local-contrast image data 130 may have a lower bit depth, the high-local-contrast image data 130 may still preserve more of the highlight and shadow details originally captured by the HDR image sensor 21 than may be preserved using conventional techniques. Moreover, despite retaining these HDR highlight and shadow details, the high-local-contrast image data 130 may be used with the relatively low-bitdepth data paths commonly in use (e.g., 8 bit data paths). Thereafter, the high-local-contrast image data 130 may be processed according to any suitable image processing. As will be discussed below, such image processing may include processing for determining the brightness mask 128 for a subsequent frame of image data.

Figure 8:
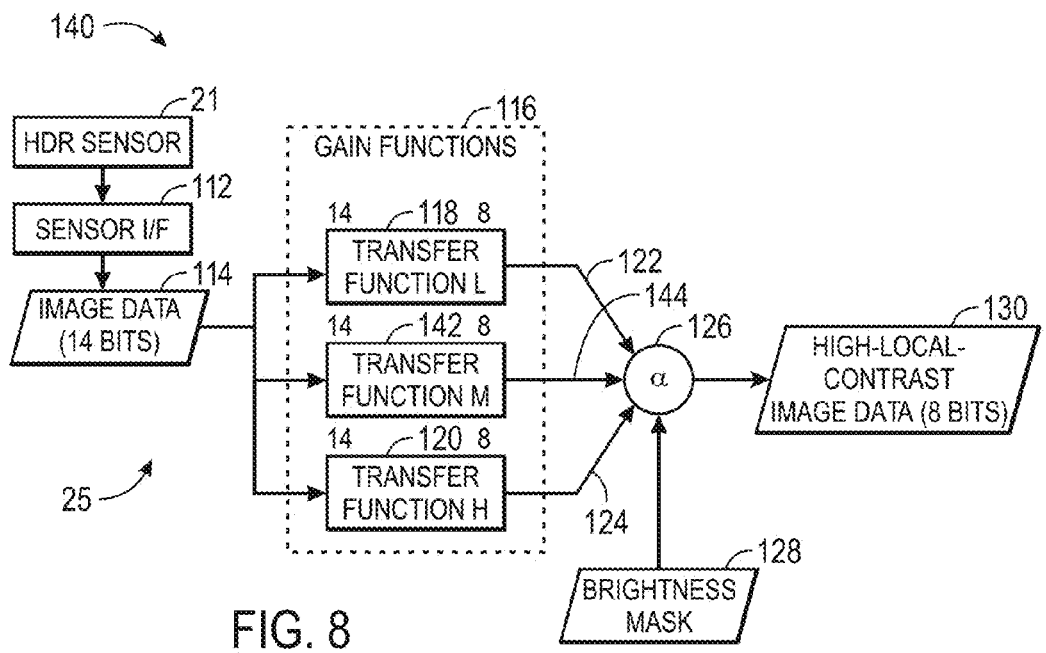

In the system 110 of FIG. 7 discussed above, the image data 114 from the HDR image sensor 21 may be processed by at least two gain functions 116 to preserve much of the local contrast across the high dynamic range captured by the HDR image sensor 21. A system 140 of FIG. 8 is provided to illustrate that the image data 114 may be processed using any higher number of gain functions 116 as suitable, such as the three gain functions 116 shown in FIG. 8. It should be appreciated that any suitable number of gain functions 116 may be employed to preserve the local contrast details across the dynamic range of the image data 114. For example, additional gain functions 116 may be particularly warranted when an HDR image sensor 21 obtains image data 114 of a particularly high bit depth (e.g., 14 bits or greater), capturing a relatively higher dynamic range, or if the scene 62 contains a significant amount of high contrast, small detail content (such that a blur-filter followed by thresholding might not implement a satisfactory metric for tone mapping). The additional gain functions 116 may be employed to more precisely capture the additional details at various levels of the dynamic range captured by such an HDR image sensor 21.

In the system 140 of FIG. 8, the gain functions 116 include not only a low-level transfer function 118 and a high-level transfer function 120, but also a midlevel transfer function 142. These gain functions 116 respectively output image data of a lower bit depth than the image data 114 that preserves contrast in a specific dynamic range of the image data 114. For example, in the manner noted above, the low-level transfer function 118 may output the shadow-preserving image data 122 and the transfer function 120 may output the highlight-preserving image data 124. Here, the midlevel transfer function 142 may output image data 144 of a lower bit depth (e.g., 8 bits) that preserves details across a midlevel dynamic range of the image data 114 (e.g., possibly excluding some highlight details and some shadow details). A brightness mask 128 obtained using any suitable technique, such as those disclosed herein, may be provided to the alpha processing component 126 to generate high-local-contrast image data 130. As noted above, this high-local-contrast image data 130 may be further processed using any suitable techniques.

Figure 9:
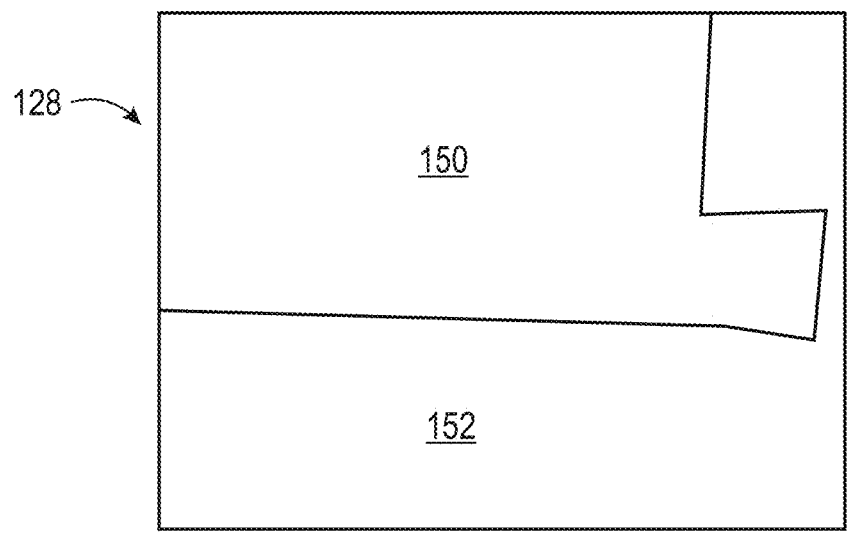
FIGS. 9 and 10 are schematic diagrams representing brightness masks that may be employed by the systems of FIGS. 7 and 8 to obtain high-local-contrast image data, in accordance with embodiments.

The brightness mask 128 may indicate, for example, what proportion of the shadow-preserving image data 122 or 124 should be output by the alpha processing component 126 to produce the high-local-contrast image data 130. Two basic examples of a brightness mask 128 appear in FIGS. 9 and 10. As shown in the example of FIG. 9, the brightness mask 128 may identify certain areas of the image data 114 that are expected to correspond to a high-brightness area 150 or a low-brightness area 152. After a portion of the image data 114 that corresponds to the high-brightness area 150 is processed through the gain functions 116, the alpha processing component 126 may generally include a greater proportion of the highlight-preserving image data 124 than the shadow-preserving image data 122. Likewise, after a portion of the image data 114 that corresponds to the low-brightness area 152 is processed through the gain functions 116, the alpha processing component 126 may generally include a greater proportion of the shadow-preserving image data 122 than the highlight-preserving image data 124. The resulting high-local-contrast image data 130 may therefore include both highlight and shadow details despite being of a lower bit depth than the image data 114 from the HDR image sensor 21.

Figure 10:
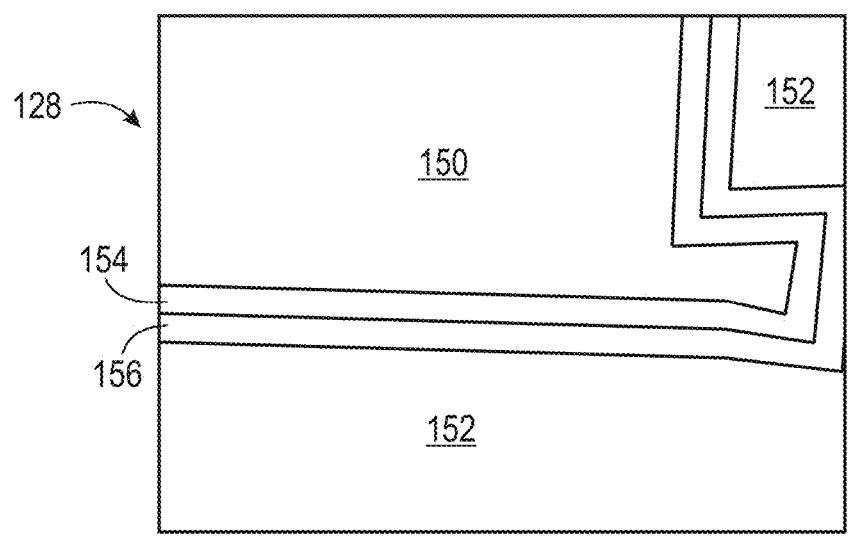

The brightness mask 128 may include any suitable number of levels, each representing some proportion of shadow-preserving image data 122 or 124 that may be mixed to produce the high-local-contrast image data 130. For example, the brightness mask 128 shown in FIG. 10 includes four different mixing levels corresponding to various levels of brightness in the image data 114. In the example of FIG. 10, the area 150 corresponds to a high-brightness area and the area 152 corresponds to low-brightness area. Areas 154 and 156 respectively represent areas of intermediate brightness. The brightness mask 128 may include any suitable number of levels, but to avoid strong artifacts, the brightness mask 128 may be limited to indicating a maximum gain of approximately 4 between the high-brightness areas 150 and the low-brightness areas 152.

In practice, the boundaries illustrated in the examples of the brightness mask 128 of FIGS. 9 and 10 may be blurred or otherwise softened before being applied in the alpha processing component 126. Applying such blurring may reduce the likelihood of visible image artifacts (e.g., halos) in the high-local-contrast image data 130. By way of example, any of the brightness masks 128 described in the systems disclosed herein may be determined based on luminance. Gray scale luminance associated with the image data 114 or a previous frame of processed image data may be quantized into approximately 4 to 16 levels and low pass filtered, but more or fewer levels may be employed. Moreover, to avoid halos, a Gaussian blur filter with a large support (e.g., approximately ¹⁄₁₆ of the vertical image size) or another suitable blurring filter may be applied to the brightness mask 128.

The brightness mask 128 may be generated using a feed-forward or feedback process. For example, as shown by a system 160 of FIG. 11, which represents one embodiment of the system 110 of FIG. 7, the brightness mask 128 may be generated in real time using a feed-forward brightness mask generator 162. In the system 160, the HDR image sensor 21 may provide the image data 114 of a relatively high dynamic range bit depth (e.g., 14 bits) through the sensor interface (I/F) 112. The image data 114 may simultaneously enter a first-in-first-out (FIFO) buffer 164 to be held back while the feed-forward brightness mask generator 162 determines the brightness mask 128. The brightness mask generator 162 may down sample the image data 114 in a downsampler component 166 and determine a bilinear mask interpolation of the downsampled image data in a bilinear mask interpolator block 168. That is, the bilinear mask interpolator block 168 may [note to inventors: how does the bilinear mask interpolator determine the brightness mask?]. The downsampler component 166 may be a programmable downsampler in some embodiments. For example, the downsampler component 166 may be a programmable downsampler capable of down sampling the image data 114 between 4:1 and 16:1. When the image data 114 is downsampled a greater amount in the downsampler 166, the processing in the bilinear mask interpolator may be less intense, but the brightness mask 128 may be coarser-grained.

As should be appreciated, only some of the image data 114 is held in the FIFO buffer 164. Only a certain number of lines of the image data 114 may be streamed into the FIFO buffer 164 at any given time, depending on the size of the scaling/blurring kernel that is processed by the brightness mask generator 162, as may be suitable to create smooth transitions in the brightness mask 128. Without a sufficient amount of image data 114 being streamed to the brightness mask generator 162 and the FIFO buffer 164, the brightness mask generator 162 may not have sufficient blurring. As a result, obvious artifacts could appear when the shadow-preserving image data 122 and the highlight-preserving image data 124 are mixed by the alpha processing component 126. It is expected that between 8 and 32 lines should generally be sufficient to avoid such obvious artifacts. The FIFO buffer 164 may represent a buffer in any suitable memory 14 of the electronic device 10. For example, in some embodiments, the FIFO buffer 164 may represent SRAM on an AXI bus.

When the image data 114 exits the FIFO buffer 164, this delayed image data 114 may be processed by the gain functions 116. As noted above, the low-level transfer function 118 may reduce the bit depth of the image data 114 while substantially preserving the shadow details of the image data 114, while the high-level transfer function 120 may reduce the bit depth of the image data 114 while substantially preserving the highlight details of the image data 114. Thus, when the brightness mask 128 causes the alpha processing component 126 to mix the shadow-preserving image data 122 from the low-level transfer function 118 and the highlight-preserving image data 124 from the high-level transfer function 120, the highlight and shadow details of the image data 114 may be preserved.

Figure 11:
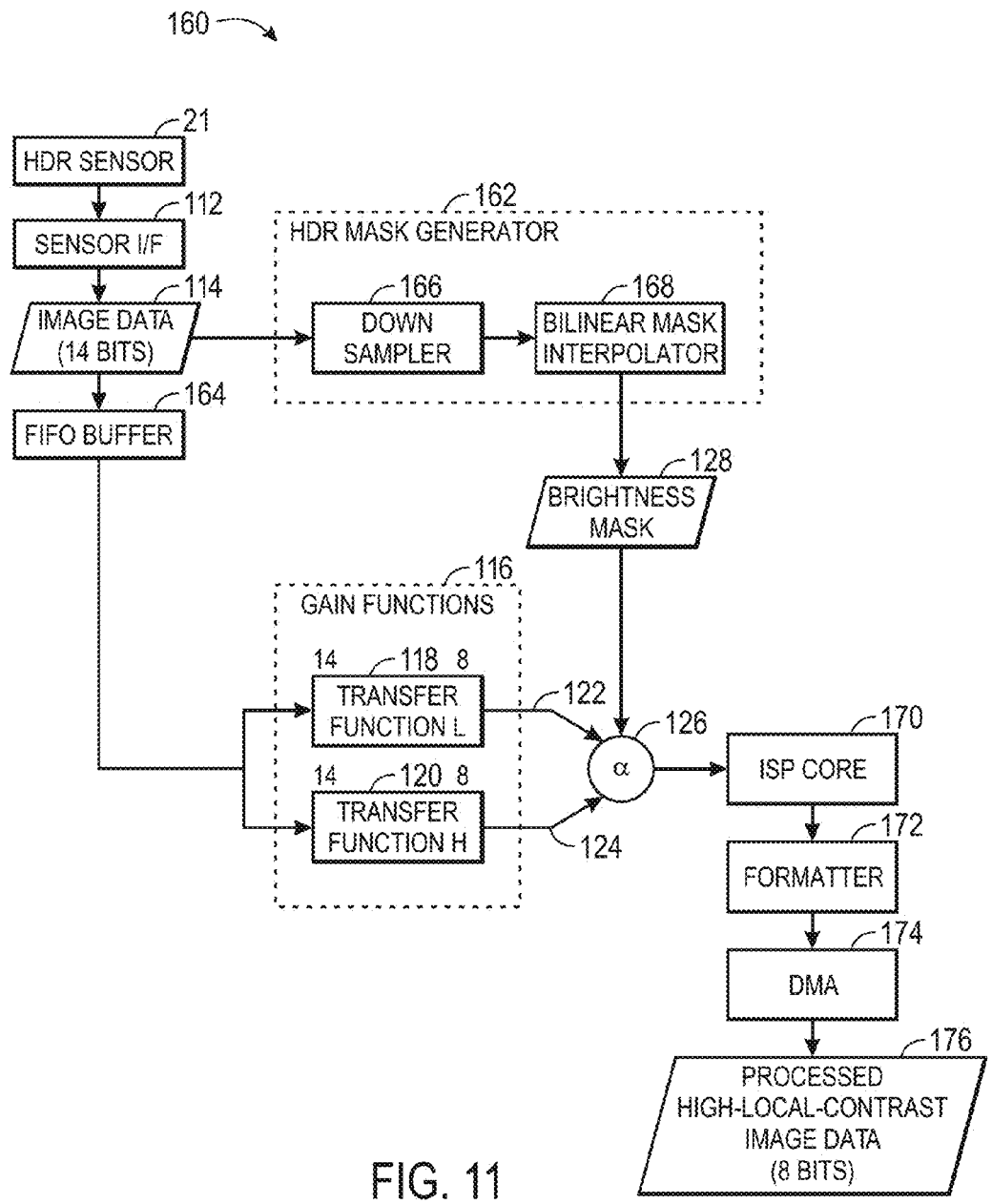
FIG. 11 is a schematic block diagram of a system for obtaining high-local-contrast image data using a feed-forward brightness mask generator, in accordance with an embodiment.

As shown in the system 160 of FIG. 11, the high-local-contrast image data 130, now having a manageable bit rate for further processing, may enter an image signal processing (ISP) core 170. The ISP core 170 may undertake any suitable additional processing of the high-local-contrast image data 130. After such processing, the image data may be formatted in a formatter component 172, which may represent, for example, a programmable 4:2:2 and/or a 4:2:0 formatter. This formatted image data may pass through a direct memory access (DMA) component 174 thus to be received as processed high-local-contrast image data 176 by other components of the electronic device 10.

Figure 12:
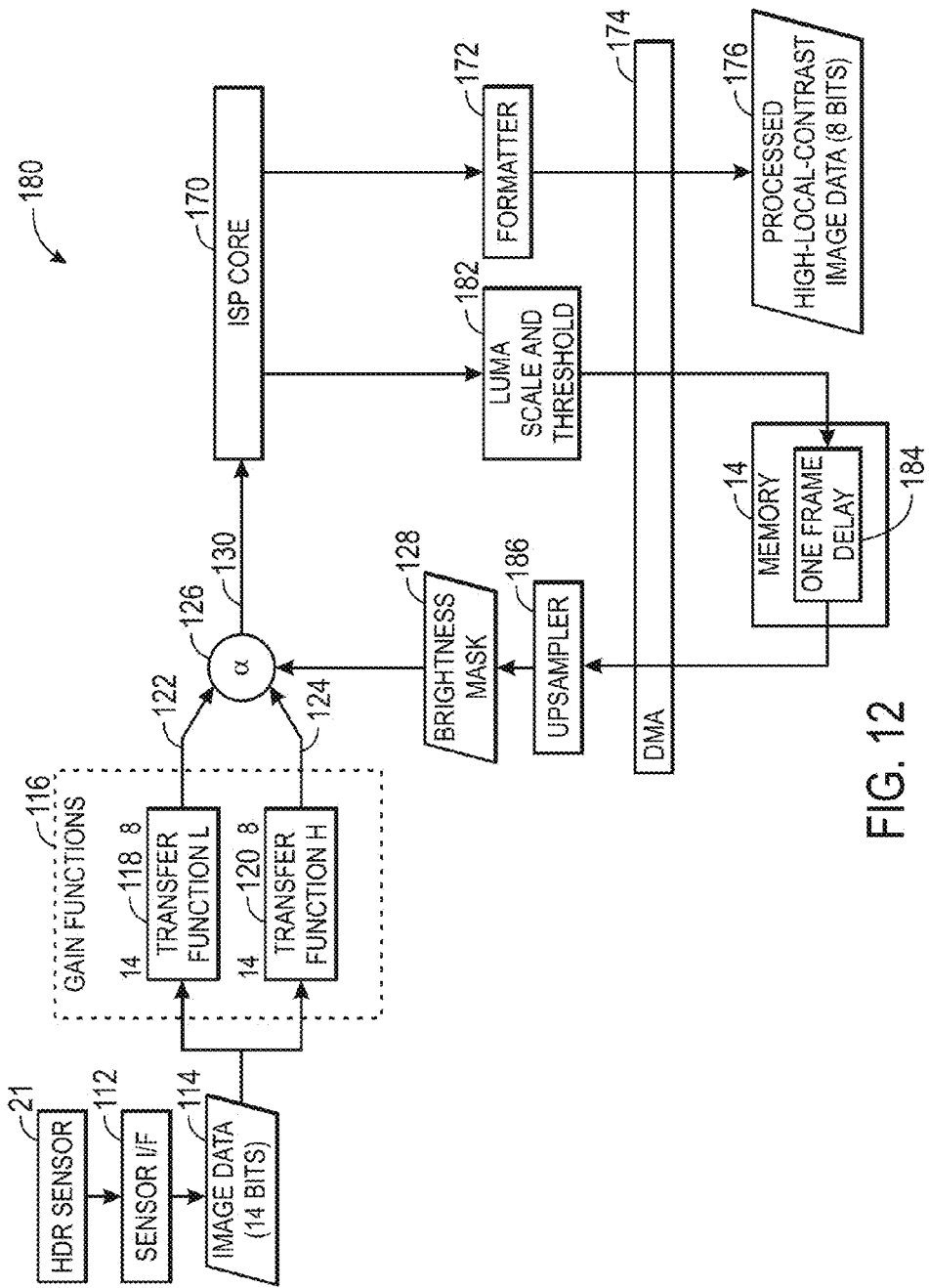
FIG. 12 is a schematic block diagram of a system for obtaining high-local-contrast image data using a hardware feedback brightness mask generator, in accordance with an embodiment.
Figure 13:
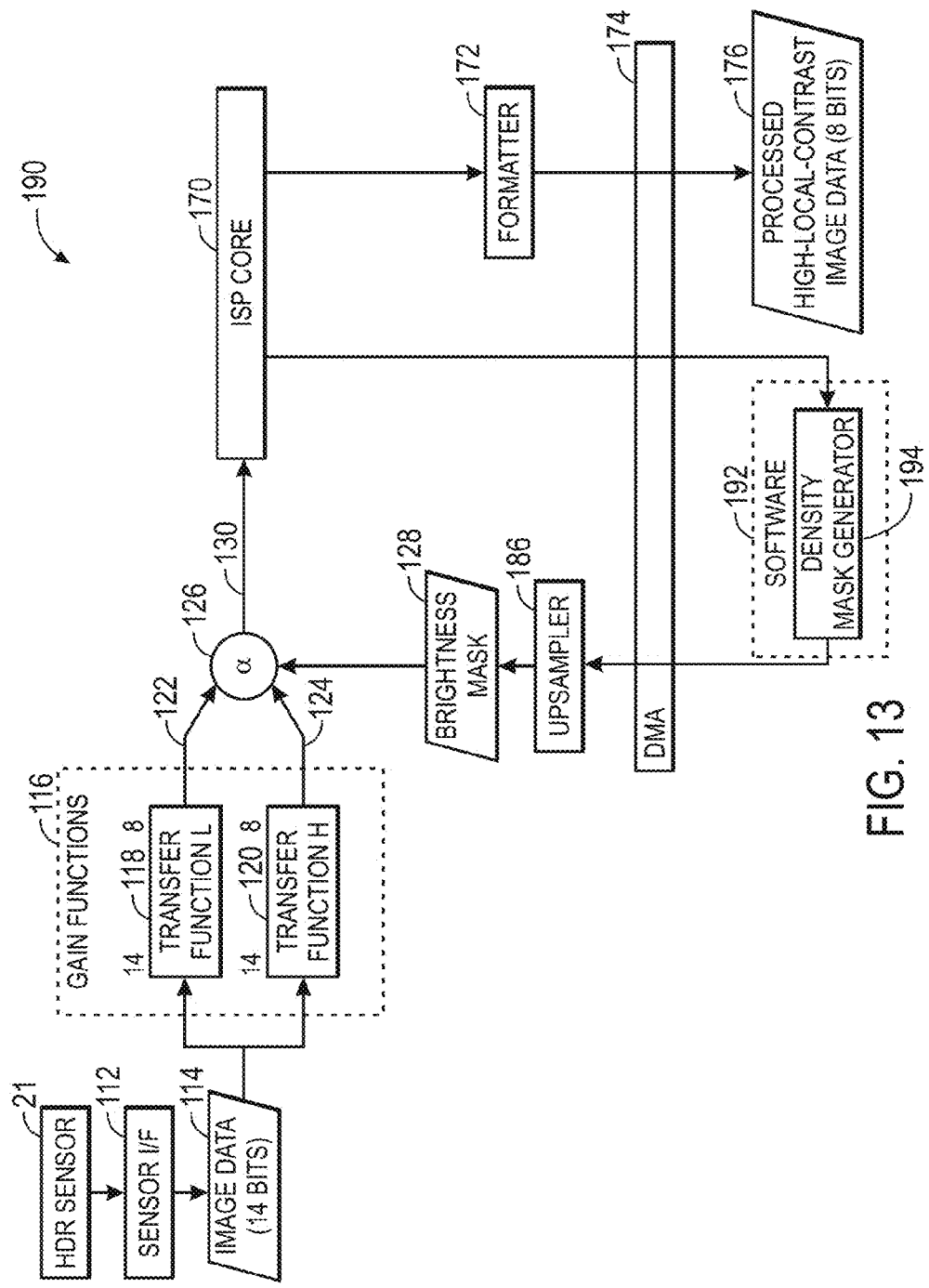
FIG. 13 is a schematic block diagram of a system for obtaining high-local-contrast image data using a software feedback brightness mask generator, in accordance with an embodiment.
Figure 14:
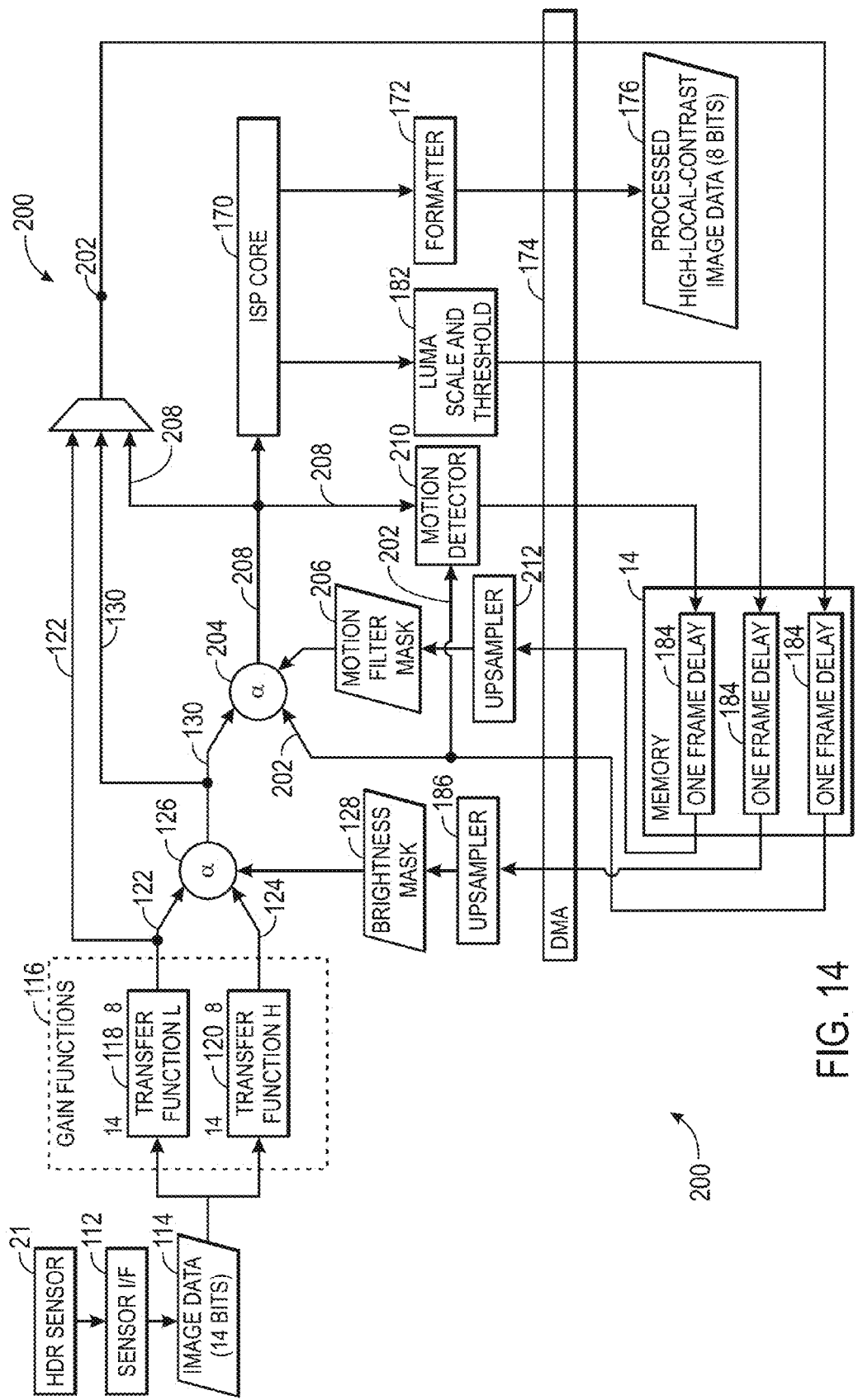
FIG. 14 is a system for obtaining high-local-contrast image data using a feedback brightness mask generator with motion compensation, in accordance with an embodiment.

The brightness mask 128 also may be determined using a feedback process, as generally illustrated by image processing systems of FIGS. 12-14. In particular, a system 180 of FIG. 12 represents a system for obtaining a processed high-local-contrast image data 176 using a feedback process in hardware to generate the brightness mask 128. As shown in FIG. 12, the HDR image sensor 21 may provide the image data 114 having a relatively high bit depth through the sensor interface 112. As noted above, because the image data 114 from the HDR image sensor 21 has a relatively high bit depth, this image data 114 generally may include a high dynamic range of details, including both shadow details and highlight details.

The image data 114 may be processed by gain functions 116 to reduce the bit depth to a more manageable bit depth for processing. As discussed above, the image data 114 may be simultaneously processed by a low-level transfer function 118 to produce shadow-preserving image data 122 and a high-level transfer function 120 to produce the highlight-preserving image data 124. Depending on the information indicated by the brightness mask 128 data, the alpha processing component 126 may mix the shadow-preserving image data 122 and 124 in varying proportions to produce the high-local-contrast image data 130, which may be supplied to the ISP core 170. Notably, because the system 180 uses a hardware feedback process to generate the brightness mask 128, it should be appreciated that the brightness mask 128 being applied to generate the current frame of high-local-contrast image data 130 has been determined based on a previous frame of high-local-contrast image data 130.

In the example of FIG. 12, the system 180 may determine the brightness mask 128 for the current frame of high-local-contrast image data 130 based on a previous frame of high-local-contrast image data 130 that has been received by the ISP core 170. This previous frame of high-local-contrast image data may undergo any suitable processing before entering a luma scale and threshold component 182. The luma scale and threshold component 182 may scale and threshold a luminance image to determine a downscaled brightness mask 183. In some embodiments, the downscaled brightness mask 183 may use relatively few bits (e.g., 3 to 6) to represent gain levels.

The downscaled brightness mask 183 data may pass through the DMA component 174 to be held in the memory 14 for one frame delay 184, before being upsampled in an upsampler component 186 and output as the brightness mask 128. In some embodiments, the downscaled brightness mask 183 may be downscaled 4:1 by the luma scale and threshold component 182 and the upsampler component 186 may upsample 1:4, but it should be appreciated that any suitable amount of downscaling and upsampling may be undertaken. Indeed, in some embodiments, no amount of scaling may take place. As noted above, the brightness mask 128, determined using image data from a previous frame, may be used to generate the current frame of high-local-contrast image data 130 when applied in the alpha processing component 126. Thereafter, in the manner discussed above, the ISP core 170 may perform any suitable image processing on the high-local-contrast image data 130 before it is formatted in the formatter component 172, and output through the DMA component 174 as the processed high-local-contrast image data 176.

Additionally or alternatively, the brightness mask 128 may be generated in a feedback process using some form of software or firmware processing. For example, as shown in a system 190 of FIG. 13, the brightness mask 128 may be generated in software 192 running on one or more of the processor(s) 12 of electronic device 10. Like the systems 110, 160, and 180 of FIGS. 7, 11, and 12, respectively, in the system 190 of FIG. 13, the image data 114 from the HDR image sensor 21 may be provided through the sensor interface (I/F) 112 to be processed in the gain functions 116. When the image data 114 has been processed by the low-level transfer function 118 into shadow-preserving image data 122 and the high-level transfer function 120 to produce highlight-preserving image data 124, this image data may be alpha processed 126 in proportions determined by the brightness mask 128, as generally discussed above.

In the system 190 of FIG. 13, the brightness mask 128 may be generated in a feedback process using software or firmware. Specifically, a previous frame of high-local-contrast image data 130 may be provided to software 192 from the ISP core 170 through the DMA component 174. The software 192 may determine the brightness mask 128 using any suitable techniques. For example, the software 192 may include a density mask generator component 194 that may ascertain a likely brightness or luminance density of the next frame of high-local-contrast image data that will be mixed by the alpha processing component 126. If the density mask generator 194 produces a mask that is downscaled from the full size of the image captured by the HDR image sensor 21, an upsampler component 186 may upsample such a downscaled mask to obtain the brightness mask 128, which may be provided to the alpha processing component 126.

When the brightness mask 128 is generated in a feedback process, some form of motion compensation may be beneficial. As such, a system 200 of FIG. 14 represents an example that performs the brightness mask 128 generation in a hardware feedback process that is compensated for motion that may occur from frame to frame of the image data captured. [fix].

In the system 200 of FIG. 14, the brightness mask 128 may be generated using any suitable feedback technique, including those described above with reference to FIGS. 12 and 13. In the example of FIG. 14, the brightness mask 128 is generated based at least partly on a previous frame of image data, as provided by the ISP core 170. Such image data may be scaled and thresholded in the luma scale and threshold component 182, for example, and received by the upsampler component 186 after being temporarily stored in the memory 14 for one frame delay 184.

The alpha processing component 126 may mix the shadow-preserving image data 122 from the low-level transfer function 118 and the highlight-preserving image data 124 from the high-level transfer function 120 to produce the high-local-contrast image data 130. To compensate for motion that may occur from frame to frame, the high-level-contrast image data 130 may be mixed with prior frame image data 202 in alpha processing component 204. The alpha processing component 204 may mix the of high-local-contrast image data 130 and the prior frame image data 202 in a proportion varying depending upon a motion filter mask 206, to produce motion compensated image data 208. The determination of the motion filter mask 206 is described below. The motion compensated image data 208 output by the alpha processing component 204, the shadow-preserving image data 122 from the low-level transfer function 118, and/or the high-local-contrast image data 130 may be selectable as the prior frame image data 202 used to determine the motion filter mask 206, as schematically represented by a multiplexer 209.

The motion filter mask 206 generally may be determined by a motion detector component 210, which may compare the motion compensated image data 208 with the prior frame image data 202. Differences between the motion compensated image data 208 and the prior frame image data 202 may indicate motion occurring between the most recent and previous frames of image data. After a one frame delay 184, during which the determination by the motion detector 210 is stored in the memory 14, an upsampler component 212 may receive the motion filter data and upsample the data, if previously downscaled, to obtain the motion filter mask 206.

By determining the brightness mask 128 based on one or more previous frames of motion compensated image data 208, the brightness mask 128 may be more likely to remain accurate despite motion occurring from frame to frame. As such, the brightness mask 128 may more likely accurately reflect the brightness levels of the incoming image data 114, thereby producing high-local-contrast image data 130 that preserves highlight and shadow details. Thereafter, in the manner discussed above, the ISP core 170 may provide any additional suitable processing before outputting the processed high-local-contrast image data 176, which may be formatted in a formatter component 172 and provided to other components of the electronic device 10 through the DMA component 174.

Figure 15:
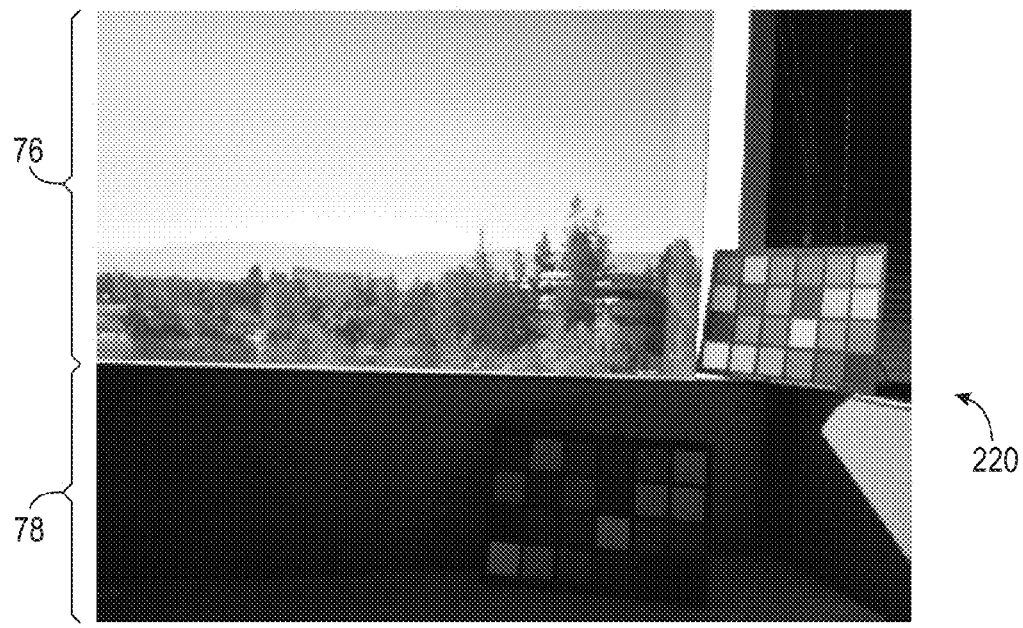
FIG. 15 is a conventional image obtained using conventional image processing techniques.
Figure 16:
FIG. 16 is a high-local-contrast image obtained using the techniques disclosed herein, in accordance with an embodiment.

Using the systems and techniques disclosed above, the electronic device 10 may obtain images with substantially improved local contrast (e.g., high dynamic range (HDR) images), preserving highlight and shadow details alike from a single exposure. FIGS. 15 and 16 represent photographs respectively obtained using a conventional technique and techniques disclosed herein. As can be seen by a photograph 220 of FIG. 15, an image of the scene 62 generally includes some of the highlight details in the high-brightness areas 76 and some of the shadow details in the low-brightness areas 78.

However, not all of the highlight details and shadow details may be preserved because only a single transfer function may have been applied to the entire image. In contrast, a photograph 230 of FIG. 16 represents a photograph based on high-local-contrast image data 130 obtained using the techniques disclosed above. In the photograph 230 of FIG. 16, more highlight details in the high-brightness area 76 and shadow details from the low-brightness area 78 can be seen than in the photograph 220 of FIG. 15.

Technical effects of the present disclosure include obtaining high-local-contrast image data without multiple exposures for different dynamic ranges, largely preserving highlight details and shadow details from a single image capture. By processing image data of a relatively higher bit depth into image data of a relatively lower bit depth using at least two gain functions (e.g., a low-level transfer function and a high-level transfer function), and then blending the resulting image data from these gain functions depending on local brightness levels, high local contrast from the original image data may be preserved. Images obtained using these presently disclosed techniques may be more representative of the original scene being captured, as well as more pleasing to see. In addition, because the resulting high-local-contrast image data obtained in this manner may have a relatively lower bit depth than the original image data captured by the image sensor of an image capture device of the electronic device, the high-local-contrast image data may be more manageable for additional image processing.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An image signal processor comprising:
   first data path circuitry of a first bit depth configured to receive first image data of the first bit depth captured by an image sensor;
   front-end image processing logic circuitry configured to convert the first image data into second image data of a second bit depth, wherein the second bit depth is lower than the first bit depth, while preserving highlight details of the first image data or shadow details of the first image data, or both, by respectively applying at least two transfer functions to at least two copies of the first image data and mixing results of the applying; and
   second data path circuitry of the second bit depth configured to output the second image data to other image processing logic circuitry of the image signal processor, wherein at least a portion of the other image processing logic circuitry is configured to determine a brightness mask for use when mixing the results, the brightness mask based at least partly on a derived luminance density estimate of a next frame of the second image data using a previous frame of the second image data.

2. The image signal processor of claim 1, wherein the first bit depth is of 10 bits or higher and the second bit depth is of less than 10 bits.

3. The image signal processor of claim 1, wherein the at least two transfer functions are respectively configured to preserve the highlight details and the shadow details of the first image data.

4. The image signal processor of claim 1, wherein the front-end image processing logic circuitry is configured to convert the first image data into the second image data at least partly by respectively applying at least three gain functions to at least three copies of the first image data and mixing the results.

5. The image signal processor of claim 1, wherein the front-end image processing logic circuitry is configured to convert the first image data into the second image data such that second image data appears substantially the same as the first image data to the human eye.

6. A method of capturing an image with high local contrast comprising:
   capturing a frame of first image data of a scene using an image sensor, wherein the first image data comprises a first bit depth and wherein the first image data comprises highlight details and shadow details of the scene;
   receiving the frame of the first image data into image processing circuitry;
   applying a high-level transfer function to a first copy of the frame of the first image data to obtain high-level second image data using the image processing circuitry, wherein the high-level transfer function is configured to convert the first image data into the high-level second image data while preserving at least some of the highlight details of the first image data;
   applying a low-level transfer function to a second copy of the frame of the first image data to obtain low-level second image data using the image processing circuitry, wherein the low-level transfer function is configured to convert the first image data into the low-level second image data while preserving at least some of the shadow details of the first image data, wherein the low-level second image data and the high-level second image data comprise a second bit depth lower than the first bit depth;
   mixing the high-level second image data and the low-level second image data in variable amounts based at least in part on a brightness mask to obtain high-local-contrast second image data that comprises at least some of the highlight details and at least some of the shadow details of the frame of the first image data, wherein the brightness mask is determined based at least partly on a derived luminance density estimate of a next frame of the high-local-contrast second image data using a previous frame of the high-local-contrast second image data.

7. The method of claim 6, wherein the brightness mask is determined at least in part by ascertaining brightness levels of different respective portions of the previous frame of the high-local-contrast second image data and relating the brightness levels of the different respective portions of the previous frame of the high-local-contrast second image data to the brightness levels of the different respective portions of the frame of the first image data using feedback circuitry of the image processing circuitry.

8. The method of claim 6, wherein the brightness mask is determined at least in part by ascertaining brightness levels of different respective portions of the previous frame of the high-local-contrast second image data and relating the brightness levels of the different respective portions of the previous frame of the high-local-contrast second image data to the brightness levels of the different respective portions of the frame of the first image data using processor-executable instructions running on the processor.

9. The method of claim 6, comprising determining a motion filter mask that relates to a difference between the high-local-contrast second image data with the previous frame of high-local-contrast image data and mixing the high-local-contrast second image data with the previous frame of high-local-contrast second image data in variable amounts based at least in part on the motion filter mask to obtain motion compensated image data.

10. The method of claim 9, wherein the brightness mask is determined at least in part by ascertaining brightness levels of different respective portions of a previous frame of the motion compensated image data and relating the brightness levels of the different respective portions of the previous frame of the motion compensated image data to the brightness levels of the different respective portions of the frame of the first image data using feedback circuitry of the image processing circuitry.

11. An electronic device comprising:
   an image capture device configured to capture first image data, wherein the first image data comprises a first bit depth; and
   image processing circuitry comprising:
      receiving circuitry configured to receive a stream of the first image data;
      density mask generator circuitry configured to determine a luminance density estimate of a next frame of the stream of the first image data using a previous frame of the stream of the first image data;
      brightness mask generator circuitry configured to process a first copy of the stream of the first image data to obtain a brightness mask that generally describes brightness levels of different respective portions of the stream of the first image data based at least in part on the luminance density estimate;
      a first-in-first-out buffer configured to buffer a second copy of the stream of the first image data while the brightness mask generator is processing the first copy of the stream of the first image data;
      first transfer function component circuitry configured to apply a first transfer function to a first copy of the second copy of the stream of the first image data to obtain a first stream of second image data, wherein the second image data comprises a second bit depth and wherein the second bit depth is lower than the first bit depth;
      second transfer function component circuitry configured to apply a second transfer function to a second copy of the second copy of the stream of the first image data to obtain a second stream of second image data; and
      alpha processing component circuitry configured to receive the brightness mask, the first stream of second image data, and the second stream of second image data, wherein the alpha processing component is configured to mix the first stream of second image data and the second stream of second image data to produce output image data in proportions that vary based at least in part on the brightness mask.

12. The electronic device of claim 11, wherein the brightness mask generator circuitry comprises downsampler component circuitry configured to downsample the first copy of the stream of the first image data and bilinear mask interpolator component circuitry configured to estimate brightness levels of different respective portions of the downsampled first copy of the stream of the first image data.

13. The electronic device of claim 12, wherein the downsampler component circuitry is configured to programmably downsample the first copy of the stream of the first image data between 4:1 and 16:1.

14. The electronic device of claim 11, wherein the brightness mask generator circuitry is configured to process between 8 and 32 lines of the first copy of the stream of the first image data.

15. The electronic device of claim 11, wherein the first transfer function component circuitry is configured to apply the first transfer function, wherein the first transfer function is configured to preserve substantially all highlight details present in the first image data, and wherein the second transfer function component circuitry is configured to apply the second transfer function, wherein the second transfer function is configured to preserve substantially all shadow details present in the first image data.

16. An article of manufacture comprising:
one or more tangible, non-transitory machine-readable storage media having instructions encoded thereon for execution by a processor of an electronic device, the instructions comprising:
instructions to receive a previous frame of processed image data from an image signal processor;
instructions to determine a brightness mask based at least in part on a derived luminance density estimate of a next frame of processed image data using the previous frame of processed image data-; and
instructions to provide the brightness mask to the image signal processor to enable the image signal processor to preserve details of various subsets of a total dynamic range captured by unprocessed image data from an image sensor, depending on a brightness indication of the brightness mask.

17. The article of manufacture of claim 16, wherein the instructions comprise instructions to downscale the previous frame of processed image data after receiving the previous frame of processed image data and upscale the brightness mask before providing the brightness mask to the image signal processor.

18. An image signal processor comprising:
receiving circuitry configured to receive a stream of first dynamic range image data from an image sensor;
first gain function component circuitry configured to apply a first gain function to a first copy of the stream of first dynamic range image data to obtain a first stream of second dynamic range image data that preserves highlight details of the stream of first dynamic range image data, wherein the second dynamic range is a subset of the first dynamic range;
second gain function component circuitry configured to apply a second gain function to a second copy of the stream of first dynamic range image data to obtain a second stream of second dynamic range image data that preserves shadow details of the stream of first dynamic range image data;
image data blending component circuitry configured to obtain an output image data stream by mixing the first stream of second dynamic range image data with the second stream of second dynamic range image data in a proportion that varies depending on a brightness mask;
an image signal processor core configured to receive the output image data stream; and
brightness mask determination circuitry configured to determine the brightness mask based at least in part on density mask generator circuitry configured to derive a luminance density estimate of a next output image data stream using a previous output image data stream.

19. The image signal processor of claim 18, wherein the brightness mask determination circuitry comprises luma threshold component circuitry configured to quantize luminance of the previous output image data stream into between 4 and 16 levels.

20. The image signal processor of claim 19, wherein the luma threshold component circuitry is configured to low pass filter the quantized luminance of the previous output image data stream.

21. The image signal processor of claim 18, wherein the brightness mask determination circuitry is configured to determine the brightness mask at least in part by downscaling the previous output image data stream, determining a downscaled brightness mask based at least in part on the downscaled previous output image data stream, applying a blurring filter to the downscaled brightness mask, and upscaling the blurred downscaled brightness mask.

22. The image signal processor of claim 21, wherein the blurring filter comprises a Gaussian blur filter with a support of approximately 1/16 or greater of a vertical size of the output image data stream.

* * * * *